(12) United States Patent
Sawano et al.

(10) Patent No.: US 11,699,952 B2
(45) Date of Patent: Jul. 11, 2023

(54) POWER SUPPLY CONTROL DEVICE, POWER SUPPLY CONTROL METHOD, AND COMPUTER PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Shunichi Sawano, Yokkaichi (JP); Masayuki Kato, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 319 days.

(21) Appl. No.: 17/270,619

(22) PCT Filed: Aug. 23, 2019

(86) PCT No.: PCT/JP2019/033131
§ 371 (c)(1),
(2) Date: Feb. 23, 2021

(87) PCT Pub. No.: WO2020/045305
PCT Pub. Date: Mar. 5, 2020

(65) Prior Publication Data
US 2021/0391788 A1    Dec. 16, 2021

(30) Foreign Application Priority Data

Aug. 30, 2018  (JP) .................................. 2018-161492

(51) Int. Cl.
*H02M 3/155* (2006.01)
*H02M 1/00* (2006.01)
*H02M 1/08* (2006.01)

(52) U.S. Cl.
CPC ......... *H02M 3/155* (2013.01); *H02M 1/0009* (2021.05); *H02M 1/08* (2013.01)

(58) Field of Classification Search
CPC ....... H02M 3/155; H02M 1/0009; H02M 1/08
See application file for complete search history.

(56) References Cited

U.S. PATENT DOCUMENTS 10,063,146 B1 *  8/2018  Lee ...................... G01R 19/003
10,128,740 B1 * 11/2018  Xiong .................... H05B 47/14
(Continued)

OTHER PUBLICATIONS

International Search Report, Application No. PCT/JP2019/033131 dated Oct. 21, 2019. ISA/Japan Patent Office.

*Primary Examiner* — Kyle J Moody
(74) *Attorney, Agent, or Firm* — Honigman LLP

(57) ABSTRACT

A power supply control device controls power supply to a load through a power supply switch. A driving circuit switches on or off the power supply switch. When the driving circuit switches the power supply switch from off to on, a waveform value regarding the current waveform of a current that flows through the load is output by a waveform value detection unit to a microcomputer. The microcomputer determines power supply control conditions regarding control of power supply to the load based on the waveform value that is input from the waveform detection unit.

18 Claims, 10 Drawing Sheets

(56) References Cited

U.S. PATENT DOCUMENTS

| | | |
|---|---|---|
| 10,259,407 B2 | 4/2019 | Iwasaki et al. |
| 10,261,532 B1 | 4/2019 | Yasuda et al. |
| 2008/0203975 A1 | 8/2008 | Burlak et al. |
| 2008/0204033 A1 | 8/2008 | Burlak et al. |
| 2008/0208491 A1 | 8/2008 | Burlak et al. |
| 2009/0080130 A1 | 3/2009 | Hein |
| 2010/0295514 A1 | 11/2010 | Burlak et al. |
| 2010/0297883 A1 | 11/2010 | Burlak et al. |

* cited by examiner

FIG. 5

Power supply control table 71

| Power supply flag | 0 |
|---|---|
| Connection flag | 1 |
| Type | Valve |
| A | ... |
| B | ... |
| PWM flag | 1 |
| Duty ratio | ... |
| Inhibition flag | 0 |
| C | ... |
| D | ... |

Legend
A= Variable resistance value
B= Current threshold value
C= Former temperature difference
D= Temperature difference threshold

FIG. 6

Waveform value table 72

| | Pre-correction | Post-correction |
|---|---|---|
| Battery voltage value | ... | |
| A | ... | |
| Steady current value | ... | ... |
| Inrush current value | ... | ... |
| Time constant | ... | ... |
| Inrush current count | ... | ... |
| Rising speed | ... | ... |
| Ripple current value | ... | ... |
| Ripple current period | ... | ... |
| Reflux time | ... | ... |

Legend
A= Environmental temperature

POWER SUPPLY CONTROL DEVICE, POWER SUPPLY CONTROL METHOD, AND COMPUTER PROGRAM

CROSS-REFERENCE TO RELATED APPLICATIONS

This application is the U.S. national stage of PCT/JP2019/033131 filed on Aug. 23, 2019, which claims priority of Japanese Patent Application No. JP 2018-161492 filed on Aug. 30, 2018, the contents of which are incorporated herein.

TECHNICAL FIELD

The present disclosure relates to a power supply control device, a power supply control method, and a computer program.

BACKGROUND

JP 2016-43872A discloses a power supply control device for vehicles that controls the supply of power from a power source to a load. In this power supply control device, power is supplied from the power source to the load via a switch. The supply of power to a load is controlled by turning on and off the switch.

The power supply control device disclosed in JP 2016-43872A stores customized information indicating an operational specification of the load. Power supply control conditions related to power supply control are determined according to the operational specifications indicated by the customized information. The power supply control conditions include whether PWM (Pulse Width Modulation) control is performed on the switch, for example.

The power supply control device described in JP 2016-43872A includes a connection terminal, and the load is connected to this connection terminal. A current flows through the power source, the switch, the connection terminal, and the load in this order, and power is supplied to the load. The load connected to the connection terminal can be changed. When the load connected to the connection terminal is changed, the power supply control conditions need to be updated to conditions corresponding to the changed load.

The power supply control device described in JP 2016-43872A receives the customized information corresponding to the changed load from another device, and updates the power supply control conditions based on the received customized information. In this case, each time the load changes, the customized information needs to be transmitted from the other device, and thus there is a problem in that updating the power supply control conditions requires a long period of time.

In view of this, an object of the present disclosure is to provide a power supply control device, a power control method, and a computer program with which updating the power supply control conditions requires a short period of time.

SUMMARY

A power supply control device according to an aspect of the present disclosure is a power supply control device that controls power supply to a load via a switch, the power supply control device including a switching unit configured to switch on or off the switch, and a determination unit configured to, if the switching unit switches the switch from off to on, determine power supply control conditions regarding control of power supply to the load, based on a waveform value regarding a current waveform of a current that flows through the load.

A power supply control method according to an aspect of the present disclosure includes a step of switching on or off a switch, a step of obtaining a waveform value regarding a current waveform of a current that flows through a load if the switch is switched from off to on, and a step of determining power supply control conditions regarding control of power supply to the load based on the obtained waveform value.

A control program according to an aspect of the present disclosure causes a computer to execute a step of instructing that a switch be turned on or off, a step of obtaining a waveform value regarding a current waveform of a current that flows through a load if the switch is switched from off to on, and a step of determining power supply control conditions regarding control of power supply to the load based on the obtained waveform value.

Note that, the present disclosure can be realized as not only the power supply control device including such a characteristic processing unit, but also as the power supply control method including such characteristic processing as steps, the computer program for causing a computer to execute such steps, and the like. Furthermore, the present disclosure can be realized as a semiconductor integrated circuit that realizes a part or the entirety of the power supply control device, a power source system including the power supply control device, and the like.

Advantageous Effects of Disclosure

According to the present disclosure, updating the power supply control conditions requires a short period of time.

BRIEF DESCRIPTION OF DRAWINGS

FIG. 5 is a table diagram showing a power supply control table.

FIG. 6 is a table diagram showing a waveform value table.

DETAILED DESCRIPTION OF PREFERRED EMBODIMENTS

Figure 1:
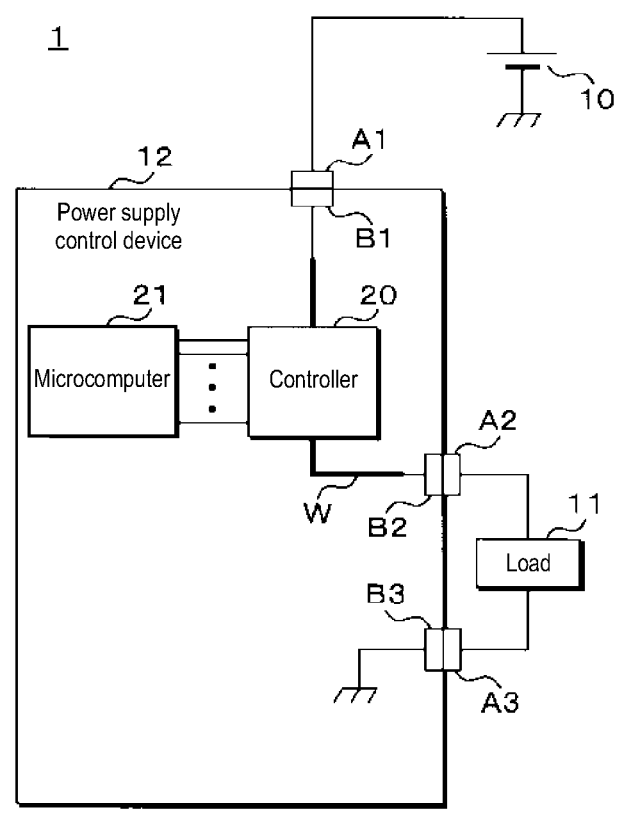
FIG. 1 is a block diagram showing the main configuration of a power source system according to an embodiment.

First, aspects of the present disclosure will be listed and described. At least some of the aspects to be described below may be combined as appropriate.

A power supply control device according to one aspect of the present disclosure is a power supply control device that controls power supply to a load via a switch, the power supply control device including a switching unit configured to switch on or off the switch, and a determination unit configured to, if the switching unit switches the switch from off to on, determine power supply control conditions regarding control of power supply to the load, based on a waveform value regarding a current waveform of a current that flows through the load.

The power supply control device according to one aspect of the present disclosure may further include a connector that is disposed on a current path of the current that flows via the switch, and to which the load is detachably connected and a connection detection unit configured to detect a connection between the load and the connector, and the switching unit may switch the switch from off to on if the connection detection unit detects the connection.

In the power supply control device according to one aspect of the present disclosure, the switching unit may switch off the switch when a current value of a current that flows through the load reaches a current threshold value or higher, and the power supply control conditions may include the current threshold value.

The power supply control device according to one aspect of the present disclosure may further include a voltage detection circuit configured to detect a voltage value of a voltage that is applied to the load, and a correction unit configured to correct the waveform value based on a voltage value detected by the voltage detection circuit.

The power supply control device according to one aspect of the present disclosure may further include a temperature estimation unit configured to estimate an ambient temperature around the load, and a second correction unit configured to correct the waveform value based on the ambient temperature estimated by the temperature estimation unit.

The power supply control device according to one aspect of the present disclosure may further include a specifying unit configured to specify a type of the load based on the waveform value, and the determination unit may determine the power supply control conditions that are to be power supply control conditions corresponding to the type specified by the specifying unit.

A power supply control method according to one aspect of the present disclosure includes a step of switching on or off a switch, a step of obtaining a waveform value regarding a current waveform of a current that flows through a load if the switch is switched from off to on, and a step of determining power supply control conditions regarding control of power supply to the load based on the obtained waveform value.

A computer program according to one aspect of the present disclosure causes a computer to execute a step of instructing that a switch be turned on or off, a step of obtaining a waveform value regarding a current waveform of a current that flows through a load if the switch is switched from off to on, and a step of determining power supply control conditions regarding control of power supply to the load based on the obtained waveform value.

In the power supply control device, the power supply control method, and the computer program according to the above-described one aspect, the power supply control conditions are determined based on the waveform value regarding the current waveform in the case where the switch is turned on from an off state. Accordingly, in the case where the load that is supplied with power via the switch is changed, the current waveform, that is, the waveform value changes, and accordingly the power supply control conditions are immediately updated. For this reason, changing the power supply control conditions require a short period of time. Example of the waveform value includes an inrush current, a steady current value, and a rising speed of a current value. The power supply control conditions include whether PWM control is performed on turning on/off of the switch, the duty ratio of a PWM signal, or the like.

In the power supply control device according to the above-described one aspect, if the load is connected to the connector, this connection is detected and the switch is switched from off to on. Thereafter, the power supply control conditions are determined based on the waveform value of the current waveform.

In the power supply control device according to the above-described one aspect, if the current value of the current that flows through the load reaches a current threshold value or more, the switch is turned off. This current threshold value is determined based on the waveform value of the current waveform.

In the power supply control device according to the above-described one aspect, the waveform value is corrected based on the voltage value of the voltage applied to the load, for example, the voltage value of the battery. For example, the obtained waveform value is corrected to the waveform value in the case where the voltage value of the voltage applied to the load is a predetermined voltage value.

In the power supply control device according to the above-described one aspect, the waveform value is corrected based on the estimated ambient temperature of the load. For example, the obtained waveform value is corrected to the waveform value in the case where the ambient temperature around the load is a predetermined temperature.

In the power supply control device according to the above-described one aspect, the type of the load is specified based on the waveform value, and the power supply control conditions are determined based on the power supply control conditions corresponding the specified type.

Specific examples of a power source system according to an embodiment of the present disclosure will be described below with reference to the drawings. Note that the present disclosure is not limited to illustrations of these, but is indicated by the claims, and all changes that come within the meaning and range of equivalency of the claims are intended to be embraced therein.

FIG. 1 is a block diagram showing the main configuration of a power source system 1 according to the present embodiment. The power source system 1 is suitably installed in a vehicle, and includes a battery 10, a load 11, a power supply control device 12, and outer connectors A1, A2, and A3. The power supply control device 12 includes a controller 20, a microcomputer 21, and inner connectors B1, B2, and B3.

The positive electrode of the battery 10 is connected to the outer connector A1. The negative electrode of the battery 10 is grounded. One end of the load 11 is connected to the outer connector A2. The other end of the load 11 is connected to the outer connector A3.

In the power supply control device 12, one end of a wire W is connected to the inner connector B1. The other end of the wire W is connected to the inner connector B2. The controller 20 is disposed at an intermediate portion of the wire W. The controller 20 is connected to the microcomputer 21. The inner connector B3 is grounded.

The outer connectors A1, A2, and A3 are detachably connected to the inner connectors B1, B2, and B3, respectively. If the outer connectors A2 and A3 are respectively connected to the inner connectors B2 and B3, the load 11 is connected to the inner connectors B2 and B3. If the outer connectors A1, A2, and A3 are respectively connected to the inner connectors B1, B2, and B3, the positive electrode of the battery 10 and one end of the load 11 are connected to the controller 20, and the other end of the load 11 is grounded.

The microcomputer 21 outputs a high-level voltage, a low-level voltage, and a PWM signal, to the controller 20. The PWM signal is constituted by the high-level voltage and the low-level voltage. Switching from the low-level voltage to the high-level voltage, or switching from the high-level voltage to the low-level voltage is periodically performed according to the PWM signal. The duty ratio of the PWM signal means the ratio of the time period in which the PWM signal indicates a high-level voltage in one cycle. The unit of the duty ratio of the PWM signal is percent.

As described later, the controller 20 includes a power supply switch 30 (see FIG. 2). If the voltage that is input by the microcomputer 21 switches from the low-level voltage to the high-level voltage, the controller 20 switches the power supply switch 30 from off to on. Accordingly, the current flows through the positive electrode of the battery 10, the power supply switch 30, and the load 11 in this order, and power is supplied from the battery 10 to the load 11. Furthermore, if the voltage that is input from the microcomputer 21 switches to the low-level voltage from the high-level voltage, the controller 20 switches the power supply switch 30 from on to off. Accordingly, supply of power from the battery 10 to the load 11 is stopped.

In the case where the PWM signal is input from the microcomputer 21, when the voltage indicated by the PWM signal switches from the low-level voltage to the high-level voltage, the controller 20 switches the power supply switch 30 from off to on. Accordingly, power is supplied from the battery 10 to the load 11. In a similar case, when the voltage indicated by the PWM signal switches from the high-level voltage to the low-level voltage, the controller 20 switches the power supply switch 30 from on to off. Accordingly, supply of power from the battery 10 to the load 11 is stopped.

If the microcomputer 21 outputs the PWM signal to the controller 20, the power corresponding to the duty ratio of the PWM signal is supplied to the load 11. The greater the duty ratio of the PWM signal is, the larger the average value of the power supplied to the load 11 is.

As described above, the controller 20 controls supply of power from the battery 10 to the load 11 through the power supply switch 30.

The load 11 is an electrical device that is installed in the vehicle. The load 11 operates using power supplied from the battery 10. When replacing the load 11, the user disconnects the outer connector A2 and the inner connector B2 and disconnects the outer connector A3 and the inner connector B3, and connects the outer connectors A2 and A3 that are connected to a new load 11 to the inner connectors B2 and B3, respectively. Accordingly, the new load 11 is connected to the inner connectors B2 and B3 of the power supply control device 12.

Figure 2:
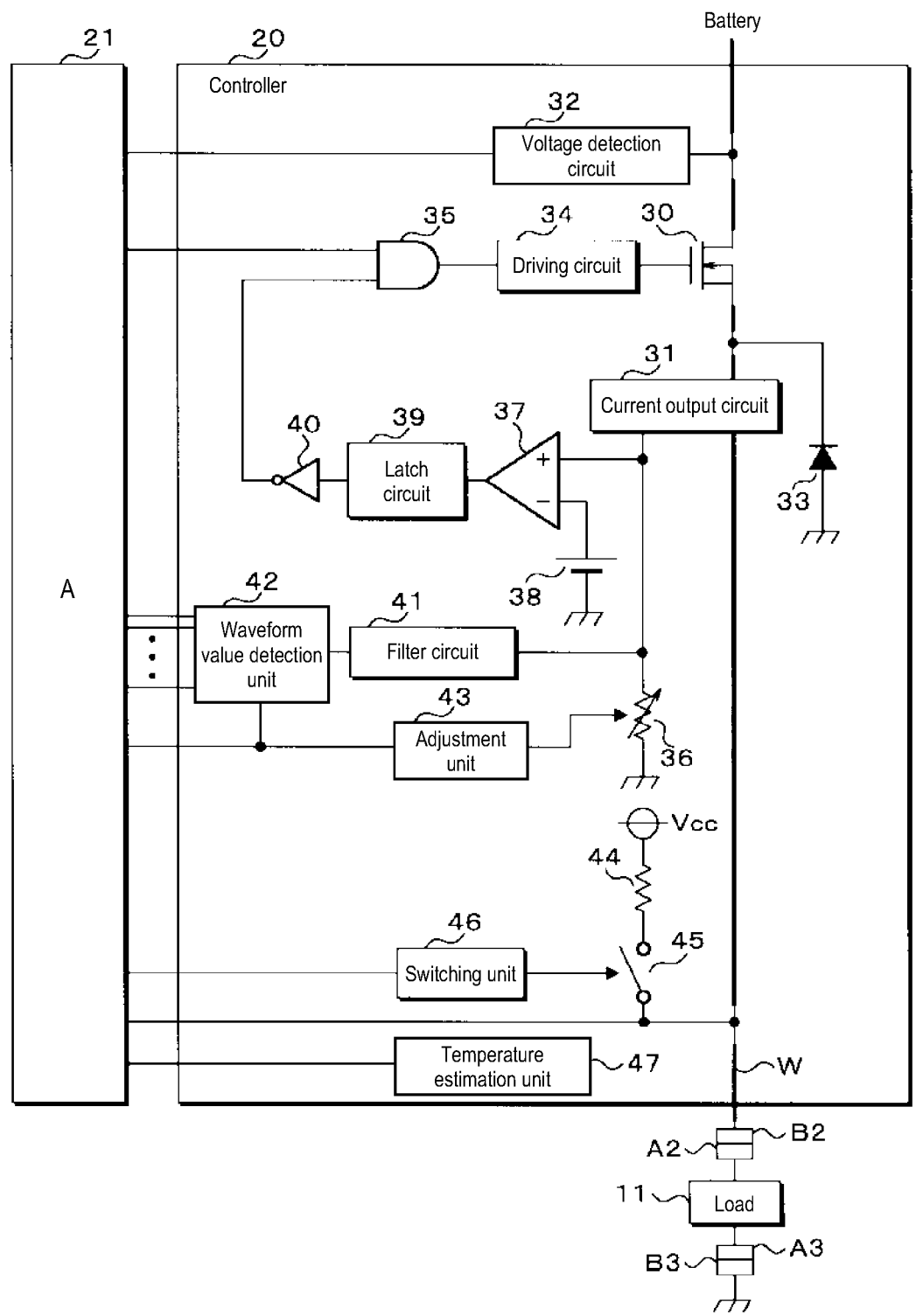
FIG. 2 is a block diagram showing the main configuration of a controller.

FIG. 2 is a block diagram showing the main configuration of the controller 20. The controller 20 includes, in addition to the power supply switch 30, a current output circuit 31, a voltage detection circuit 32, a reflux diode 33, a driving circuit 34, an AND circuit 35, a variable resistor 36, a comparator 37, a DC power source 38, a latch circuit 39, an inverter 40, a filter circuit 41, a waveform value detection unit 42, an adjustment unit 43, a voltage-dividing resistor 44, a detection switch 45, a switching unit 46, and a temperature estimation unit 47.

The power supply switch 30 is an N-channel FET (Field Effect Transistor). The AND circuit 35 includes two input ends and one output end. The comparator 37 includes a plus end, a minus end, and an output end. The invertor 40 includes an input end and an output end.

The power supply switch 30 and the current output circuit 31 are disposed at intermediate positions of the wire W. The drain of the power supply switch 30 is connected to the inner connector B1. As described above, the inner connector B1 is connected to the outer connector A1, and the outer connector A1 is connected to the positive electrode of the battery 10. The source of the power supply switch 30 is connected to the current output circuit 31. The current output circuit 31 is further connected to the inner connector B2. The inner connector B2 is connected to the outer connector A2, and the outer connector A2 is connected to one end of the load 11.

The voltage detection circuit 32, the cathode of the reflux diode 33, and the microcomputer 21 are connected to intermediate positions of the wire W. The voltage detection circuit 32 is connected to the drain of the power supply switch 30 and the microcomputer 21. The cathode of the reflux diode 33 is connected to the connection node between the source of the power supply switch 30 and the current output circuit 31. The anode of the reflux diode 33 is grounded. The microcomputer 21 is connected to the connection node between the current output circuit 31 and the inner connector B2.

The gate of the power supply switch 30 is connected to the driving circuit 34. The driving circuit 34 is connected to the output end of the AND circuit 35. The current output circuit 31 is connected to one end of the variable resistor 36. The other end of the variable resistor 36 is grounded. The connection node between the current output circuit 31 and the variable resistor 36 is connected to the plus end of the comparator 37. The minus end of the comparator 37 is connected to the positive electrode of the DC power source 38. The negative electrode of the DC power source 38 is grounded.

The output end of the comparator 37 is connected to the latch circuit 39. The latch circuit 39 is further connected to the input end of the inverter 40. One input end of the AND circuit 35 is connected to the microcomputer 21. The other input end of the AND circuit 35 is connected to the output end of the inverter 40.

The connection node between the current output circuit 31 and the variable resistor 36 is further connected to the filter circuit 41. The filter circuit 41 is also connected to the waveform value detection unit 42. The waveform value detection unit 42 is connected to the microcomputer 21.

A resistive voltage is applied to one end of the voltage-dividing resistor 44. The resistive voltage value Vcc, that is the voltage value of the resistive voltage, is a constant value such as 5 V for example. The other end of the voltage-dividing resistor 44 is connected to one end of the detection switch 45. The other end of the detection switch 45 is connected to the microcomputer 21 and the connection node between the current output circuit 31 and the inner connector B2. The adjustment unit 43, the switching unit 46, and the temperature estimation unit 47 are also connected to the microcomputer 21. The connection node between the microcomputer 21 and the adjustment unit 43 is connected to the waveform value detection unit 42.

If the voltage value of the gate of the power supply switch 30 with respect to the potential of the source is higher than or equal to a certain voltage, a current can flow through the power supply switch 30 via the drain and source. At this time, the power supply switch 30 is in the on state. When the voltage of the gate of the power source switch 30 with respect to the potential of the source is lower than the certain voltage, no current flows through the power source switch 30 via the drain and source. At this time, the power supply switch 30 is in the off state.

The microcomputer 21 outputs the high-level voltage, the low-level voltage, or the PWM signal, to the AND circuit 35. The inverter 40 outputs the high-level voltage or the low-level voltage to the AND circuit 35.

When the inverter 40 is outputting the high-level voltage, if the microcomputer 21 outputs the high-level voltage to the AND circuit 35, the AND circuit 35 outputs the high-level voltage to the driving circuit 34. In a similar case, when the microcomputer 21 is outputting the low-level voltage to the AND circuit 35, the AND circuit 35 outputs the low-level voltage to the driving circuit 34. In a similar case, when the microcomputer 21 outputs the PWM signal to the AND circuit 35, the AND circuit 35 outputs the voltage indicated by the PWM signal to the driving circuit 34.

If the voltage that is output by the AND circuit 35 switches from the low-level voltage to the high-level voltage, the driving circuit 34 increases the voltage value of the gate of the power supply switch 30 with respect to the ground potential. Accordingly, in the power supply switch 30, the voltage value of the gate with respect to the source potential rises to a certain voltage value or higher, and the power supply switch 30 is switched on.

If the voltage that is output by the AND circuit 35 switches from the high-level voltage to the low-level voltage, the driving circuit 34 decreases the voltage value of the gate of the power supply switch 30 with respect to the ground potential. Accordingly, the voltage value of the gate of the power supply switch 30 with respect to the source potential drops below a certain voltage value, and the power supply switch 30 is switched off. The driving circuit 34 functions as a switching unit.

If the driving circuit 34 switches on the power supply switch 30, a current flows through the positive electrode of the battery 10, the outer connector A1, the inner connector B1, the power supply switch 30, the current output circuit 31, the inner connector B2, the outer connector A2, the load 11, the outer connector A3, and the inner connector B3 in this order, and power is supplied to the load 11. Accordingly, the inner connector B2 and B3 are disposed on the current path of the current that flows via the power supply switch 30. If the driving circuit 34 switches off the power supply switch 30, supply of power from the battery 10 to the load 11 is stopped.

It is assumed that the load 11 is an inductive load that has a coil. In this case, while power is being supplied to the load 11 from the battery 10, energy is accumulated in the coil of the load 11. If the power supply switch 30 is switched off, a current flows through one end on the outer connector A3 side of the load 11, the reflux diode 33, the current output circuit 31, and the load 11 in this order, and the coil of the load 11 discharges energy.

While the load 11 is discharging energy, the current value of the current that flows through the reflux diode 33 decreases with a certain inclination. The reflux diode 33 is a diode for discharging energy in the load 11. If the load 11 is not an inductive load, no current flows through the reflux diode 33.

Hereinafter, the voltage value at the positive electrode of the battery 10 with respect to the ground potential is denoted as a "battery voltage value", and the current value of the current that flows to the load 11 through the wire W is denoted as a "load current value". The battery voltage value is a voltage value of the voltage that is applied to the load 11 in the case where the load 11 is connected to the inner connectors B2 and B3 and the power supply switch 30 is in the on state.

The voltage detection circuit 32 detects the battery voltage value. The voltage detection circuit 32 outputs analog voltage information indicating the detected battery voltage value, to the microcomputer 21. For example, the voltage detection circuit 32 includes two resistors. In this case, the two resistors divide the voltage of the battery 10, and output the voltage value of the divided voltage as the voltage information, to the microcomputer 21.

The current output circuit 31 is constituted using a current mirror circuit, for example, and outputs a current to the variable resistor 36. The current value of the current that is output by the current output circuit 31 to the variable resistor 36 is the value calculated by dividing the load current value by a predetermined number. The load current value, the predetermined number, and the variable resistance value of the variable resistor 36 are denoted as Ic, N, and Rv, respectively. The voltage value between the two ends of the variable resistor 36 is represented by Ic·Rv/N. "·" denotes multiplication. Hereinafter, the voltage value between the two ends of the variable resistor 36 is described as an "end-to-end voltage value".

The power source voltage value that is the voltage value of the positive electrode of the DC power source 38 with respect to the ground potential is described as "Vd". The comparator 37 compares the power source voltage value Vd with the end-to-end voltage value Vb of the variable resistor 36 (=Ic·Rv/N). If Ic·Rv/N<Vd, that is, Ic<N·Vd/Rv is satisfied, the comparator 37 outputs the low-level voltage to the latch circuit 39.

If Ic·Rv/N≥Vd, that is, Ic≥N·Vd/Rv is satisfied, the comparator 37 outputs the high-level voltage to the latch circuit 39. The current threshold value Ith of the load current value Ic is represented by N·Vd/Rv. The predetermined number N and the power source voltage value Vd are constant values. For this reason, the current threshold value Ith fluctuates in accordance with the variable resistance value Rv. The greater the variable resistance value Rv is, the smaller the current threshold value Ith is.

The microcomputer 21 outputs a resistance value signal indicating the resistance value, to the waveform value detection unit 42 and the adjustment unit 43. If the resistance value signal is input from the microcomputer 21, the adjustment unit 43 adjusts the variable resistance value of the variable resistor to the resistance value indicated by the input resistance value signal. Accordingly, the variable resistance value, that is, the current threshold value is adjusted by the microcomputer 21. As a result of the microcomputer 21 outputting the resistance value signal, the waveform value detection unit 42 is notified of the variable resistance value.

While the comparator 37 is outputting the low-level voltage, that is, while the load current value is lower than the current threshold value, the latch circuit 39 outputs the low-level voltage to the inverter 40. When the latch circuit 39 outputs the low-level voltage, the inverter 40 outputs the high-level voltage. As described above, when the inverter 40 outputs the high-level voltage, the AND circuit 35 outputs, to the driving circuit 34, the voltage that is output by the microcomputer 21, or the voltage indicated by the PWM signal, and the driving circuit 34 switches on or off the power supply switch 30 in accordance with an instruction from the microcomputer 21.

If the voltage output to the comparator 37 switches from the low-level voltage to the high-level voltage, that is, if the load current value reaches the current threshold value or higher, the latch circuit 39 switches the voltage that is output to the inverter 40 from the low-level voltage to the high-level voltage. Accordingly, the inverter 40 switches the voltage that is output to the AND circuit 35 from the high-level voltage to the low-level voltage. If the voltage that is output by the inverter 40 switches from the high-level voltage to the low-level voltage, the voltage that is output by the AND circuit 35 switches from the high-level voltage to the low-level voltage, and the driving circuit 34 switches off the power supply switch 30 independently of the output by the microcomputer 21 to the AND circuit 35.

After the voltage that is output to the inverter 40 is switched to the high-level voltage, the latch circuit 39 continues to output the high-level voltage to the inverter 40 independently of the voltage that is output by the comparator 37. Accordingly, once the load current value reaches the current threshold value or higher, the driving circuit 34 keeps the power supply switch 30 off.

The end-to-end voltage value of the variable resistor 36 is input to the filter circuit 41. The filter circuit 41 removes noise from the input analog end-to-end voltage value. The filter circuit 41 outputs, to the waveform value detection unit 42, the analog end-to-end voltage value from which noise has been removed. The filter circuit 41 is constituted using a resistor and a capacitor, for example. The waveform value detection unit 42 periodically converts the analog end-to-end voltage value into a digital end-to-end voltage value, and obtains the digital end-to-end voltage value thus converted.

Since the end-to-end voltage value Vb is represented by Ic·Rv/N, the load current value Ic is represented by N·Vb/Rv. As described above, a notification of the variable resistance value Rv is made to the waveform value detection unit 42 by the microcomputer 21. The waveform value detection unit 42 detects a plurality of waveform values of the current waveforms drawn by the load current values Ic based on the plurality of end-to-end voltage values Vb that have been periodically obtained, that is, the plurality of load current values Ic, and notifies the microcomputer 21 of the detected waveform values.

Figure 3:
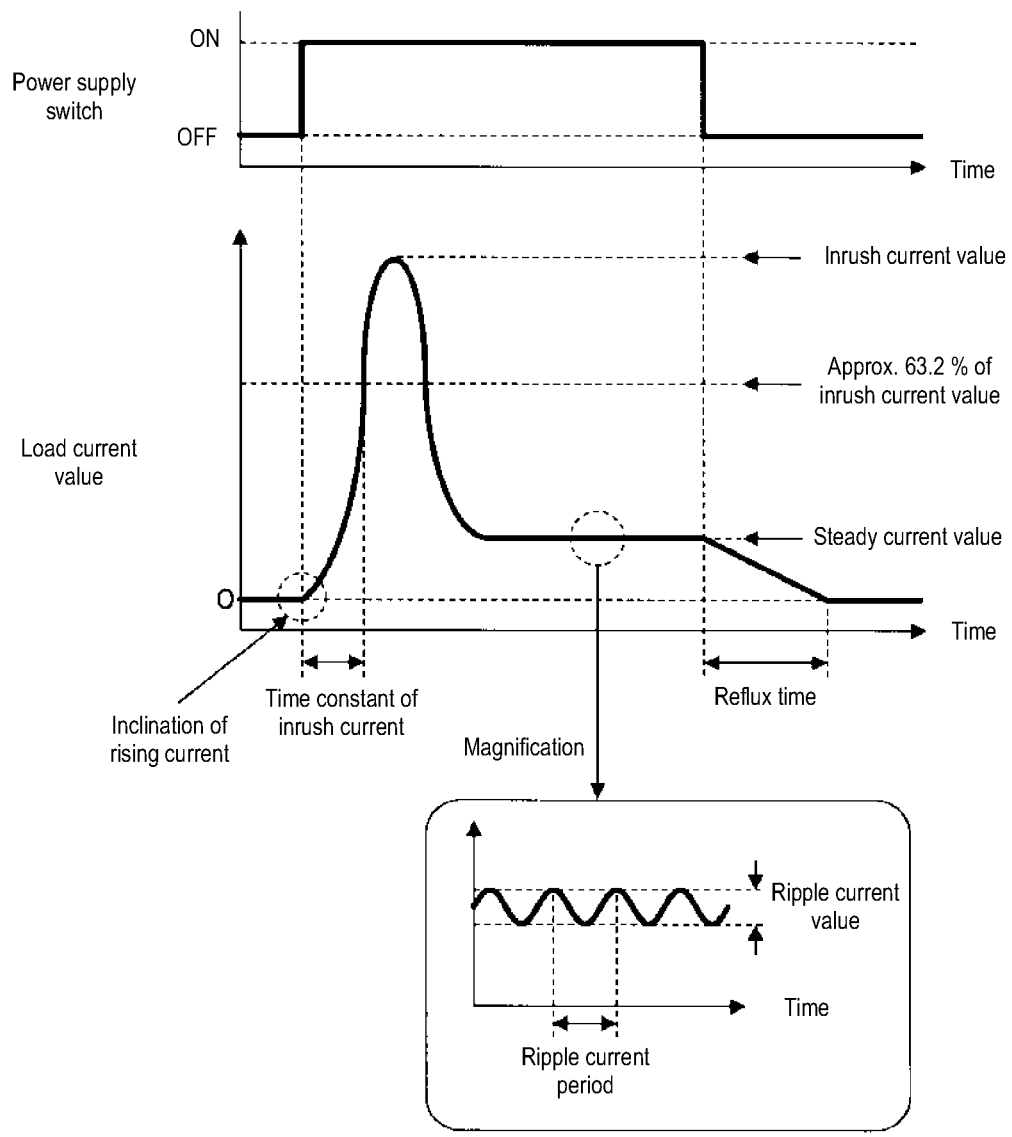
FIG. 3 is a diagram illustrating a plurality of waveform values.

FIG. 3 is a diagram illustrating the plurality of waveform values. FIG. 3 shows the transition regarding on and off of the power supply switch 30 and the transition of the load current values. The horizontal axis of these transitions represents time. The load 11 includes resistance components. For this reason, if a current flows through the load 11, the temperature of the load 11 rises, and if the flow of the current to the load 11 stops, the temperature of the load 11 drops. It is assumed that the temperature of the load 11 is low. If the power supply switch 30 is switched from off to on, as shown in FIG. 3, the load current value rapidly rises from 0 A, and thereafter rapidly drops. A current with which the current value rises and drops rapidly is an inrush current. The rising speed of the load current value regarding the inrush current is one waveform value.

The peak value of the load current value regarding the inrush current is an inrush current value. The time from when the power supply switch 30 is switched from off to on to when the load current value reaches $(1-(1/e))(=0.632)$ times the inrush current value, where "e" is a natural logarithm, is a time constant of the inrush current.

The load current value stabilizes as time passes. The average value of the stabilized current value is the steady current value. The load current value vibrates fractionally. The width of this vibration is a ripple current value. The period regarding this vibration is a ripple current period. The inrush current value, the time constant of the inrush current, the steady current value, the ripple current value, and the ripple current period are each one waveform value.

In the case where the load 11 is an inductive load, when the power supply switch 30 is switched from on to off, the load 11 discharges energy, and a current flows into the load 11 via the reflux diode 33. While the load 11 is discharging energy, the load current value decreases to 0 A with a constant inclination. The time period from when the power supply switch 30 is switched off to when the load current value reaches 0 A is a reflux time. The reflux time is also one waveform value. If the load 11 is not an inductive load, the reflux time is 0 seconds. An inrush current count, that is, the number of times of an inrush current that occurs, is also one waveform value.

The waveform value detection unit 42 outputs, to the microcomputer 21, the steady current value, the inrush current value, the inrush current time constant, the inrush current count, the rising speed of the inrush current, the ripple current value, the ripple current period, and the reflux time, as the plurality of waveform values. These values are digital values. The waveform value detection unit 42 further outputs the digital load current value to the microcomputer 21.

An on signal for making an instruction to switch on the detection switch 45 and an off signal for making an instruction to switch off the detection switch 45 are input from the microcomputer 21 to the switching unit 46 shown in FIG. 2. Upon the on signal being input, the switching unit 46 switches on the detection switch 45, and upon the off signal being input, the switching unit 46 switches off the detection switch 45. Accordingly, the switching unit 46 switches on or off the detection switch 45 in accordance with the instruction from the microcomputer 21.

The voltage value of the inner connector B2 with respect to the ground potential is input to the microcomputer 21. Hereinafter, the voltage value of the inner connector B2 based on the ground potential is described as a "connector voltage value". The analog connector voltage value is input to the microcomputer 21. The microcomputer 21 detects the connection between the inner connectors B2 and B3 and the load 11 based on the connector voltage value in the case where the power supply switch 30 is in the off state and the detection switch 45 is in the on state. The resistance value of the voltage-dividing resistor 44 is sufficiently greater than the resistance value of the load 11 that is possibly connected to the inner connectors B2 and B3.

In the case where the power supply switch 30 is in the off state and the detection switch 45 is in the on state, when the load 11 is connected to the inner connectors B2 and B3, a current flows through the voltage-dividing resistor 44 and the load 11 in this order, and the resistive voltage applied to one end of the voltage-dividing resistor 44 is divided by the voltage-dividing resistor 44 and the load 11. As a result, the connector voltage value is sufficiently lower than the resistive voltage value Vcc, and lower than a reference voltage value. The reference voltage value is a pre-set constant value. In the case where the power supply switch 30 is in the off state and the detection switch 45 is in the on state, when the load 11 is disconnected, no current flows through the voltage-dividing resistor 44. Accordingly, the connector voltage value substantially matches the resistive voltage value Vcc, and is greater than the reference voltage value.

Note that, in the case where the power supply switch 30 is in the off state and the detection switch 45 is in the on state, when the load 11 is connected to the inner connectors B2 and B3, the voltage is applied to the load 11. However, since the voltage value of the voltage applied to the load 11 is sufficiently low, the load 11 does not operate.

The temperature estimation unit 47 estimates an environment temperature that is an ambient temperature around the load 11, and outputs analog temperature information indicating the estimated environment temperature to the microcomputer 21. The temperature estimation unit 47 outputs, to the microcomputer 21, the analog voltage value corresponding to the estimated environment temperature as the analog temperature information, for example. The environment temperature estimated by the temperature estimation unit 47 is the environment temperature in the vehicle, and corresponds to not only the ambient temperature around the load 11, but also the ambient temperature around the wire W, for example.

Figure 4:
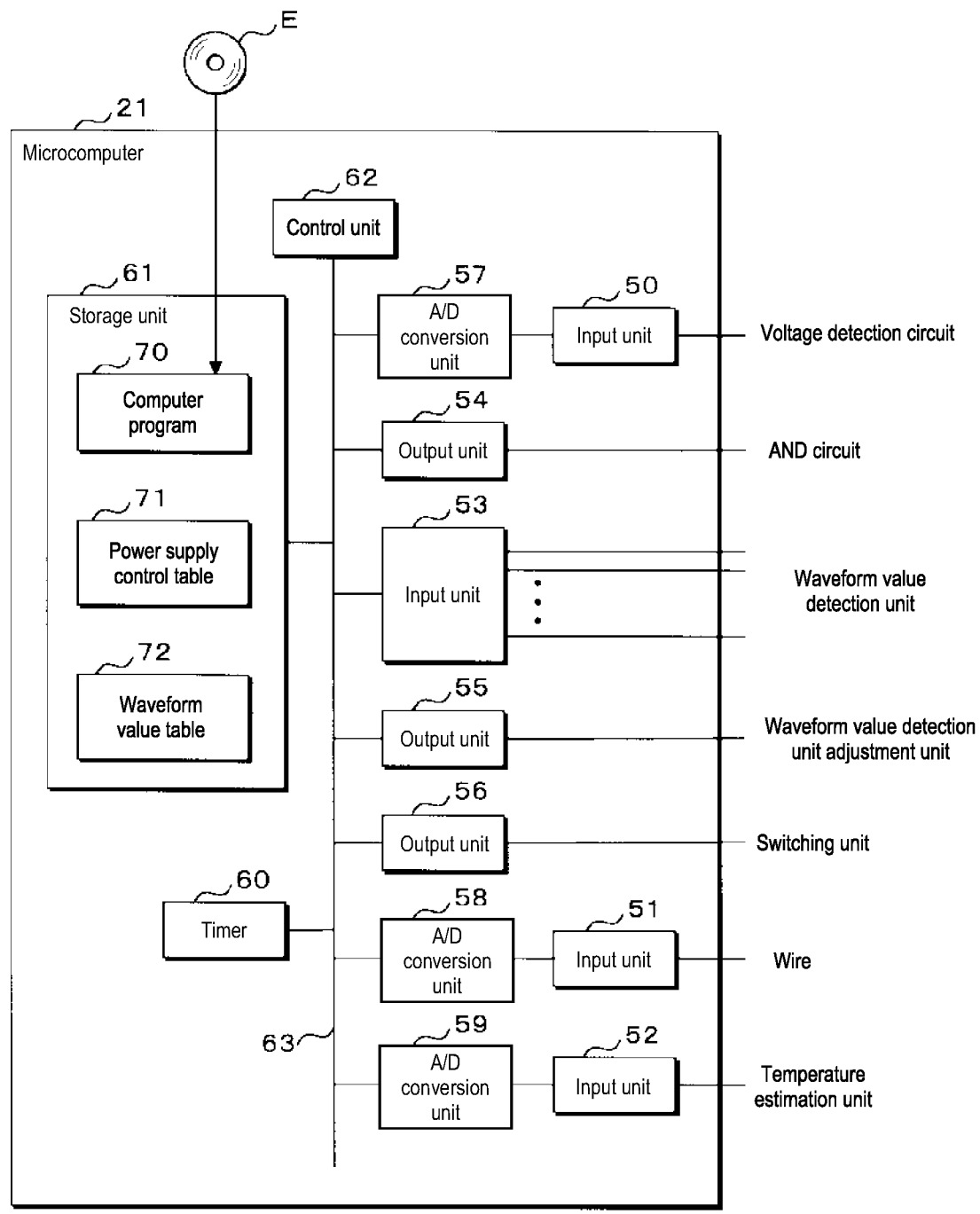
FIG. 4 is a block diagram showing the main configuration of a microcomputer.

FIG. 4 is a block diagram showing the main configuration of the microcomputer 21. The microcomputer 21 includes input units 50, 51, 52, and 53, output units 54, 55, and 56, A/D conversion units 57, 58, and 59, a timer 60, a storage unit 61, and a control unit 62. The input units 50, 51, and 52 are respectively connected to the A/D conversion units 57, 58, and 59. The input unit 53, the output units 54, 55, and 56, the A/D conversion units 57, 58, and 59, the timer 60, the storage unit 61, and the control unit 62 are connected to an internal bus 63.

The input unit 50 is further connected to the voltage detection circuit 32. The input unit 51 is further connected to an intermediate position of the wire W. The input unit 52 is further connected to the temperature estimation unit 47. The input unit 53 is further connected to the waveform value detection unit 42. The output unit 54 is further connected to one input end of the AND circuit 35. The output unit 55 is further connected to the waveform value detection unit 42 and the adjustment unit 43. The output unit 56 is further connected to the switching unit 46.

The analog voltage information is input from the voltage detection circuit 32 to the input unit 50. The input unit 50 outputs, to the A/D conversion unit 57, the analog voltage information that is input from the voltage detection circuit 32. The A/D conversion unit 57 converts the analog voltage information that is input from the input unit 50 into digital voltage information. The control unit 62 obtains the digital voltage information from the A/D conversion unit 57.

The output unit 54 outputs the high-level voltage, the low-level voltage, and the PWM signal to the AND circuit 35 in accordance with an instruction from the control unit 62. The control unit 62 also instructs the duty ratio of the PWM signal to the output unit 54.

The waveform value detection unit 42 outputs, to the input unit 53, the steady current value, the inrush current value, the inrush current time constant, the inrush current count, the rising speed of the inrush current, the ripple current value, the ripple current period, and the reflux time, as the plurality of waveform values. The control unit 62 obtains these waveform values from the input unit 53. The waveform value detection unit 42 also outputs the load current value to the input unit 53, and the control unit 62 obtains the load current value from the input unit 53.

The output unit 55 outputs, to the waveform value detection unit 42 and the adjustment unit 43, the resistance value signal indicating the resistance value in accordance with an instruction from the control unit 62. Accordingly, the adjustment unit 43 adjusts the variable resistance value of the variable resistor 36 to the resistance value of the resistance value signal, and the waveform value detection unit 42 is notified of the variable resistance value.

The output unit 56 outputs the on signal and the off signal to the switching unit 46 in accordance with an instruction from the control unit 62. As described above, if the on signal is input to the switching unit 46, the switching unit 46 switches on the detection switch 45, and if the off signal is input, the switching unit switches off the detection switch 45.

The analog connector voltage value is input to the input unit 51. The input unit 51 outputs the input analog connector voltage value to the A/D conversion unit 58. The A/D conversion unit 58 converts the analog connector voltage value that is input from the input unit 51 to the digital connector voltage value. The control unit 62 obtains the digital connector voltage value from the A/D conversion unit 58.

The analog temperature information is input from the temperature estimation unit 47 to the input unit 52. The input unit 52 outputs, to the A/D conversion unit 59, the analog temperature information that is input from the temperature estimation unit 47. The A/D conversion unit 57 converts the analog temperature information that is input from the input unit 52 into the digital temperature information. The control unit 62 obtains the digital temperature information from the A/D conversion unit 59.

The timer 60 starts and ends clocking in accordance with an instruction from the control unit 62. The clocking time clocked by the timer 60 is read out from the timer 60 by the control unit 62.

The storage unit 61 is a non-volatile memory. A computer program 70, a power supply control table 71, and a waveform value table 72 are stored in the storage unit 61.

The control unit 62 includes a processing element that executes processing. The processing element is a CPU (Central Processing Unit), for example. The processing element included in the control unit 62 executes the computer program 70, and thereby executes power supply control processing for controlling power supply to the load 11, wire protection processing for protecting the wires W from abnormal temperatures, and connection detection processing for detecting the connection between the inner connectors B2 and B3 and the load 11. The computer program 70 is used for causing the processing element (computer) of the control unit 62 to execute the power supply control processing, the wire protection processing, and the connection detection processing.

Note that the number of processing elements included in the control unit 62 may be two or more. In this case, a plurality of processing elements may also execute the power supply control processing, the wire protection processing, or the connection detection processing in cooperation.

Furthermore, the computer program 70 may also be stored in a storage medium E in a manner readable by the processing element of the control unit 62. In this case, the computer program 70 that is read out from the storage medium E by a readout device (not shown) is stored in the storage unit 61. The storage medium E is an optical disk, a flexible disk, a magnetic disk, a magnetic optical disk, a semiconductor memory, or the like. The optical disk is a CD (Compact Disk)-ROM (Read Only Memory), a DVD (Digital Versatile Disk)-ROM, a BD (Blu-ray (registered trademark) Disk), or the like. The magnetic disk is a hard disk, for example. In addition, the computer program 70 may also be downloaded from an external device (not shown) connected to a communication network (not shown), and stored in the storage unit 61.

FIG. 5 is a table diagram illustrating a power supply control table 71. The power supply control table 71 includes a power supply flag field, a connection flag field, a type field, a variable resistance value field, a current threshold value field, a PWM flag field, a duty ratio field, an inhibition flag field, a former temperature difference field, and a temperature threshold value field.

The value of a power supply flag is stored in the power supply flag field. The value of the power supply flag is set to 0 or 1 by the control unit 62. The value of the power supply flag being 0 means that the power supply switch 30 is in the off state and no power is supplied to the load 11. The value of the power supply flag being 1 means that the power supply switch 30 is in the on state and power is supplied to the load 11.

The value of a connection flag is stored in the connection flag field. The value of the connection flag is set to 0 or 1 by the control unit 62. The value of the connection flag being 0 means that the load 11 is not connected to the inner connectors B2 and B3. The value of the connection flag being 1 means that the load 11 is connected to the inner connectors B2 and B3.

The type of the load 11 is stored in the type field. Example of the type of the load 11 includes a valve, a brushed motor, or a magnet clutch. The type of the load 11 is updated by the control unit 62.

The variable resistance value of the variable resistor 36 is stored in the variable resistance value field. The variable resistance value stored in the variable resistance value field is updated by the control unit 62.

The current threshold value is stored in the current threshold value field. The current threshold value stored in the current threshold value field is updated by the control unit 62. As described above, the current threshold value Ith is represented by N·Vd/Rv. N, Vd, and Rv are, a predetermined number, a power source voltage value, and a variable resistance value, respectively. Since the predetermined number N and the power source voltage value Vd are constant numbers, the decision of the current threshold value Ith is equivalent to the decision of the variable resistance value Rv.

The value of a PWM flag is stored in the PWM flag field. The value of the PWM flag is set to 0 or 1 by the control unit 62. The value of the PWM flag being 0 means that PWM control is not performed on turning on/off of the power supply switch 30. The value of the PWM flag being 1 means that PWM control is performed on turning on/off of the power supply switch 30.

The value of the duty ratio of the PWM signal is stored in the duty ratio field. The value of the duty ratio is updated by the control unit 62.

The value of an inhibition flag is stored in the inhibition flag field. The values of the inhibition flag is set to 0 or 1 by the control unit 62. The value of the inhibition flag being 0 means that power supply via the wire W is permitted. The value of the inhibition flag being 1 means that power supply via the wire W is inhibited.

The control unit 62 repeatedly executes the wire protection processing. In the wire protection processing, the control unit 62 repeatedly calculates a difference between the environment temperature and the temperature of the wire W. Hereinafter, the temperature of the wire W is described as "wire temperature". The temperature difference formerly calculated by the control unit 62 is stored in the former temperature difference field. The former temperature difference is updated by the control unit 62.

A temperature threshold value regarding wire protection is stored in the temperature threshold value field. In the wire protection processing, the temperature of the wire is prevented from exceeding the temperature threshold value.

FIG. 6 is a table diagram showing the waveform value table. In the connection detection processing, the control unit 62 corrects the waveform values that are input from the waveform value detection unit 42 to the input unit 53 to waveform values in the case where the battery voltage value is a predetermined voltage value and the environment temperature is a predetermined temperature. A predetermined voltage value is 12 V for example.

The waveform value table includes a battery voltage value field, an environment temperature field, a steady current value field, an inrush current value field, a time constant field, a inrush current count field, a rising speed field, a ripple current value field, a ripple current period field, and a reflux time field.

The battery voltage value is stored in the battery voltage value field. The battery voltage value in the battery voltage value field is updated by the control unit 62. As described above, the control unit 62 obtains the voltage information indicating the battery voltage value from the A/D conversion unit 57.

The environment temperature is stored in the environment temperature field. The environment temperature of the environment temperature field is updated by the control unit 62. As described above, the control unit 62 obtains the temperature information indicating the environment temperature from the A/D conversion unit 57.

The steady current value field, the inrush current value field, the time constant field, the inrush current count field, the rising speed field, the ripple current value field, the ripple current value period field, and the reflux time field respectively store pre-correction and post-correction values of the steady current value; the inrush current value; the time constant; the inrush current count; the rising speed; the ripple current value; the ripple current period; and the reflux time. The pre-correction and post-correction values in these fields are updated by the control unit 62.

Figure 7:
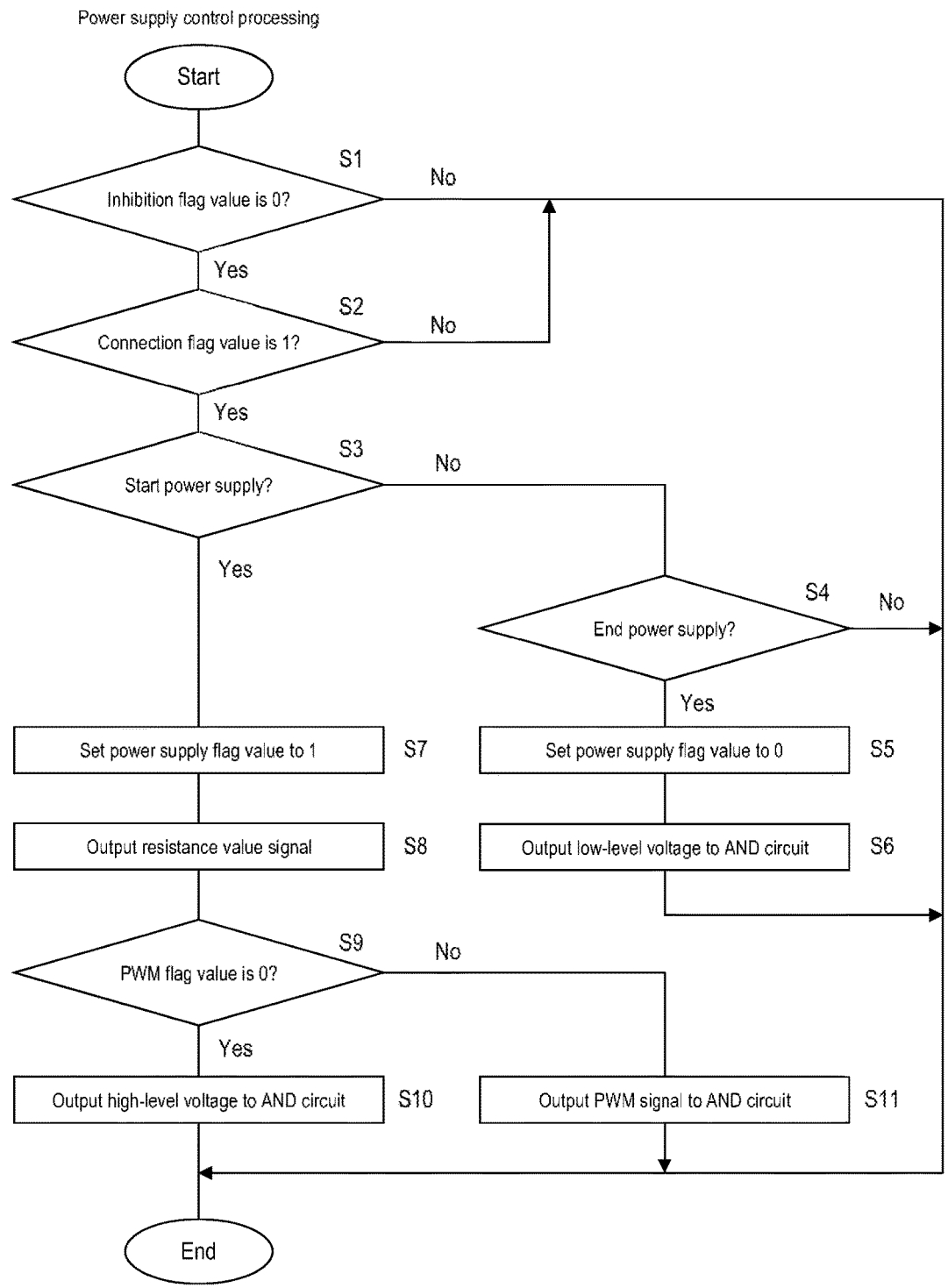
FIG. 7 is a flowchart showing the procedure of power supply control processing.

FIG. 7 is a flowchart showing the procedure of power supply control processing. The control unit 62 periodically executes the power supply control processing. In the description of the power supply control processing, it is assumed that the inverter 40 outputs the high-level voltage, in other words, the load current threshold value is lower than the current threshold value. If the inverter 40 outputs the low-level voltage, the driving circuit 34 keeps the power supply switch 30 off independently of the output by the output unit 54.

First, the control unit 62 determines whether the value of the inhibition flag in the power supply control table 71 is 0 (step S1). If it is determined that the value of the inhibition flag is 0, in other words, power supply via the wire W is permitted (step S1: YES), the control unit 62 determines whether the value of the connection flag is 1 (step S2).

If it is determined that the value of the inhibition flag is not 0, in other words, the value of the inhibition flag is 1 (S1: NO), or it is determined that the value of the connection flag is not 1, in other words, that the value of the connection flag is 0 (S2: NO), the control unit 62 ends the power supply control processing. As described above, the value of the inhibition flag being 1 means that power supply via the wire W is inhibited. The value of the connection flag being 0 means that the load 11 is not connected to the inner connectors B2 and B3.

If it is determined that the value of the connection flag is 1, in other words, the load 11 is connected to the inner connectors B2 and B3 (S2: YES), the control unit 62 determines whether to start power supply to the load 11 (step S3). In step S3, for example, if the start signal for instructing the start of power supply is input to the input unit (not shown), the control unit 62 makes a determination to start power supply, and if the start signal has not been input to the input unit, the control unit 62 makes a determination to not start power supply.

If a determination is made to not start power supply (S3: NO), the control unit 62 determines whether to end power supply to the load 11 (step S4). In step S4, for example, when an end signal for instructing the end of power supply is input to the input unit (not shown), the control unit 62 makes a determination to end power supply, and if the end signal has not been input to the input unit, the control unit 62 makes a determination to not end power supply. If a determination is made to not end power supply (S4: NO), the control unit 62 ends the power supply control processing.

If a determination is made to end power supply (S4: YES), the control unit 62 sets the value of the power supply flag in the power supply control table 71 to 0 (step S5), and makes an instruction to the output unit 54 to output the low-level voltage to the AND circuit 35 (step S6). Accordingly, the AND circuit 35 outputs the low-level voltage to the driving circuit 34, and the driving circuit 34 switches off the power supply switch 30. Making an instruction to the output unit 54 to output the low-level voltage corresponds to making an instruction to the driving circuit 34 to switch on the power supply switch 30. After executing the step S6, the control unit 62 ends power control processing.

If a determination is made to start power supply (S3: YES), the control unit 62 sets the value of the power supply flag in the power supply control table 71 to 1 (step S7), and instructs the output unit 55 to output the resistance value signal for which the resistance value is the variable resistance value in the power supply control table 71 (step S8). Accordingly, the adjustment unit 43 adjusts the variable resistance value of the variable resistor 36 to the variable resistance value indicated in the power supply control table 71. As a result, the current threshold value is changed to the current threshold value indicated in the power supply control table 71. As described above, the waveform value detection unit 42 is notified of the variable resistance value of the power supply control table 71.

After executing step S8, the control unit 62 determines whether the value of the PWM flag in the power supply control table 71 is 0 (step S9). If it is determined that the value of the PWM flag is 0, that is, if a determination is made to not perform PWM control (S9: YES), the control unit 62 instructs the output unit 54 to output the high-level voltage to the AND circuit 35 (step S10). Accordingly, the voltage that is output by the AND circuit 35 to the driving circuit 34 switches to the high-level voltage, and the driving circuit 34 switches on the power supply switch 30. As a result, power is supplied to the load 11. Making an instruction to the output unit 54 to output the high-level voltage corresponds to making an instruction to the driving circuit 34 to switch on the power supply switch 30.

If it is determined that the value of the PWM flag is not 0, in other words, that the value of the PWM flag is 1 (S9: NO), the control unit 62 instructs the output unit 54 to output the PWM signal to the AND circuit 35 (step S11). Accordingly, the AND circuit 35 outputs the voltage indicated by the PWM signal to the driving circuit 34, and the driving circuit 34 alternately switches on and off the power supply switch 30 in accordance with the voltage indicated by the PWM signal. Accordingly, power is supplied to the load 11. The duty ratio of the PWM signal is adjusted to the duty ratio stored in the power supply control table 71.

Making an instruction to the output unit 54 to output the PWM signal corresponds to making an instruction to the driving circuit 34 to alternately switch on and off the power supply switch 30. As described above, the value of the PWM flag being 1 means that PWM control is performed.

After executing one of steps S10 and S11, the control unit 62 ends the power supply control processing.

As described above, in power supply control processing, the control unit 62 of the microcomputer 21 performs power supply control in accordance with the power supply control conditions indicated in the power supply control table 71. The power supply control conditions are conditions regarding control of power supply to the load 11, and specifically, include the variable resistance value (current threshold value), the value of the PWM flag, and the duty ratio of the PWM signal. The power supply control conditions are changed as appropriate in the connection detection processing.

Figure 8:
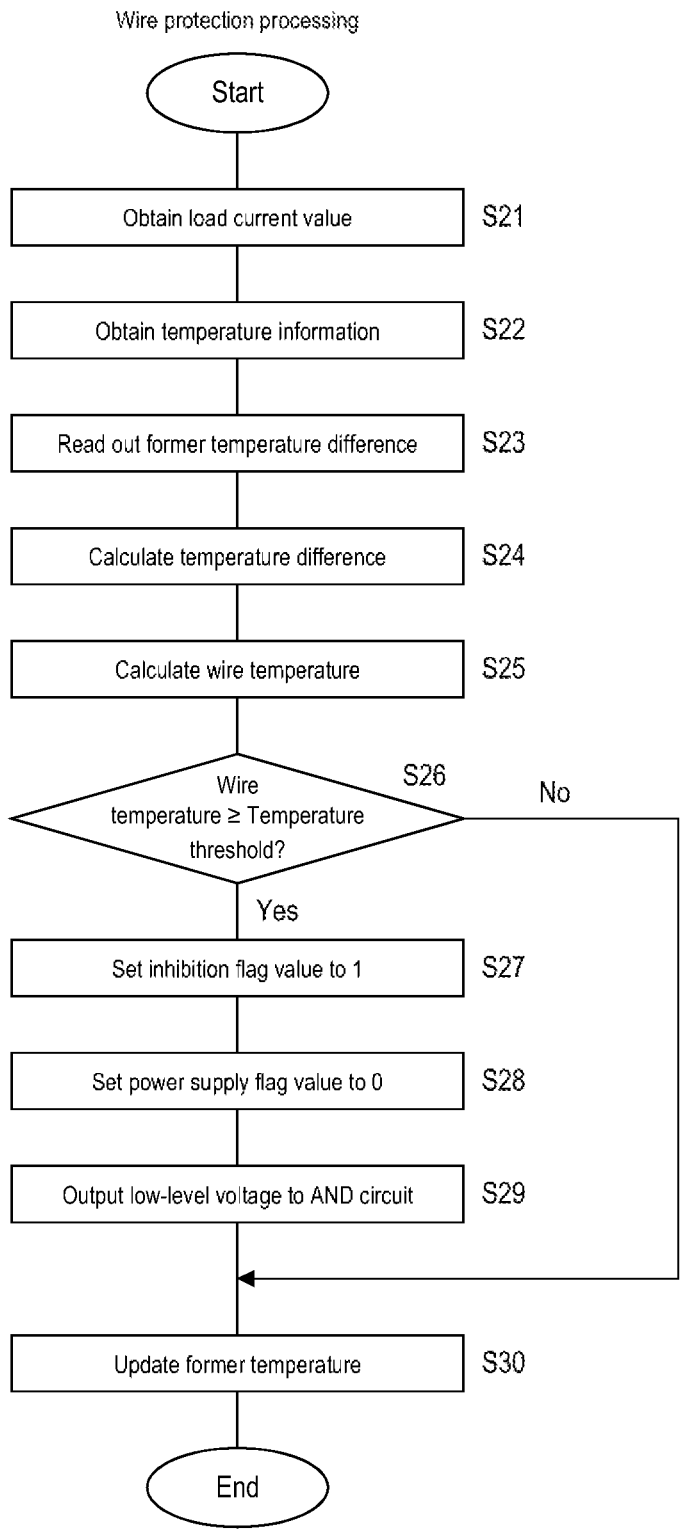
FIG. 8 is a flowchart showing the procedure of wire protection processing.

FIG. 8 is a flowchart showing the procedure of wire protection processing. The control unit 62 periodically executes the wire protection processing. In the wire protection processing, first, the control unit 62 obtains the load current value from the input unit 53 (step S21), and obtains the temperature information from the A/D conversion unit 57 (step S22). Next, the control unit 62 reads out the former temperature difference stored in the power supply control table 71 (step S23).

Next, the control unit 62 calculates the temperature difference between the wire temperature of the wire W and the environment temperature in the vehicle, based on the load current value obtained in step S21, the environment temperature obtained in step S22, and the former temperature difference read out in step S23 (step S24). The former temperature difference read out in step S23 is the temperature difference calculated in the previous wire protection processing. Next, the control unit 62 calculates the wire temperature by adding the environment temperature obtained in step S22 to the temperature difference calculated in step S24 (step S25).

Next, the control unit 62 determines whether the wire temperature calculated in step S25 is higher than or equal to the temperature threshold value in the power supply control table 71 (step S26). If it is determined that the wire temperature is greater than or equal to the temperature threshold (S26: YES), the control unit 62 sets the value of the inhibition flag to 1 (step S27), sets the value of the power supply flag to 0 (step S28), and instructs the output unit 54 to output the low-level voltage to the AND circuit 35 (step S29).

Accordingly, the AND circuit 35 switches the voltage that is output to the driving circuit 34 to the low-level voltage, and the driving circuit 34 switches off the power supply switch 30. As a result, power supply to the load 11 is stopped. Since the value of the inhibition flag is set to 1 after the driving circuit 34 switches off the power supply switch 30, the power supply switch 30 is not switched on in the power supply control processing.

If it is determined that the wire temperature is lower than the temperature threshold value (S26: NO), or after executing step S29, the control unit 62 updates the former temperature difference in the power supply control table 71 to the temperature difference calculated in step S24 (step S30), and ends the wire protection processing.

As described above, if the wire temperature is higher than or equal to the temperature threshold, the driving circuit 34 switches off the power supply switch 30 and keeps the power supply switch 30 off. For this reason, the wire temperature does not exceed the temperature threshold value.

Note that the former temperature difference needs only be a temperature difference that has been formerly calculated, and thus is not limited to the temperature difference calculated in the previous wire protection processing. The former temperature difference may also be the temperature difference calculated two times before.

Figure 9:
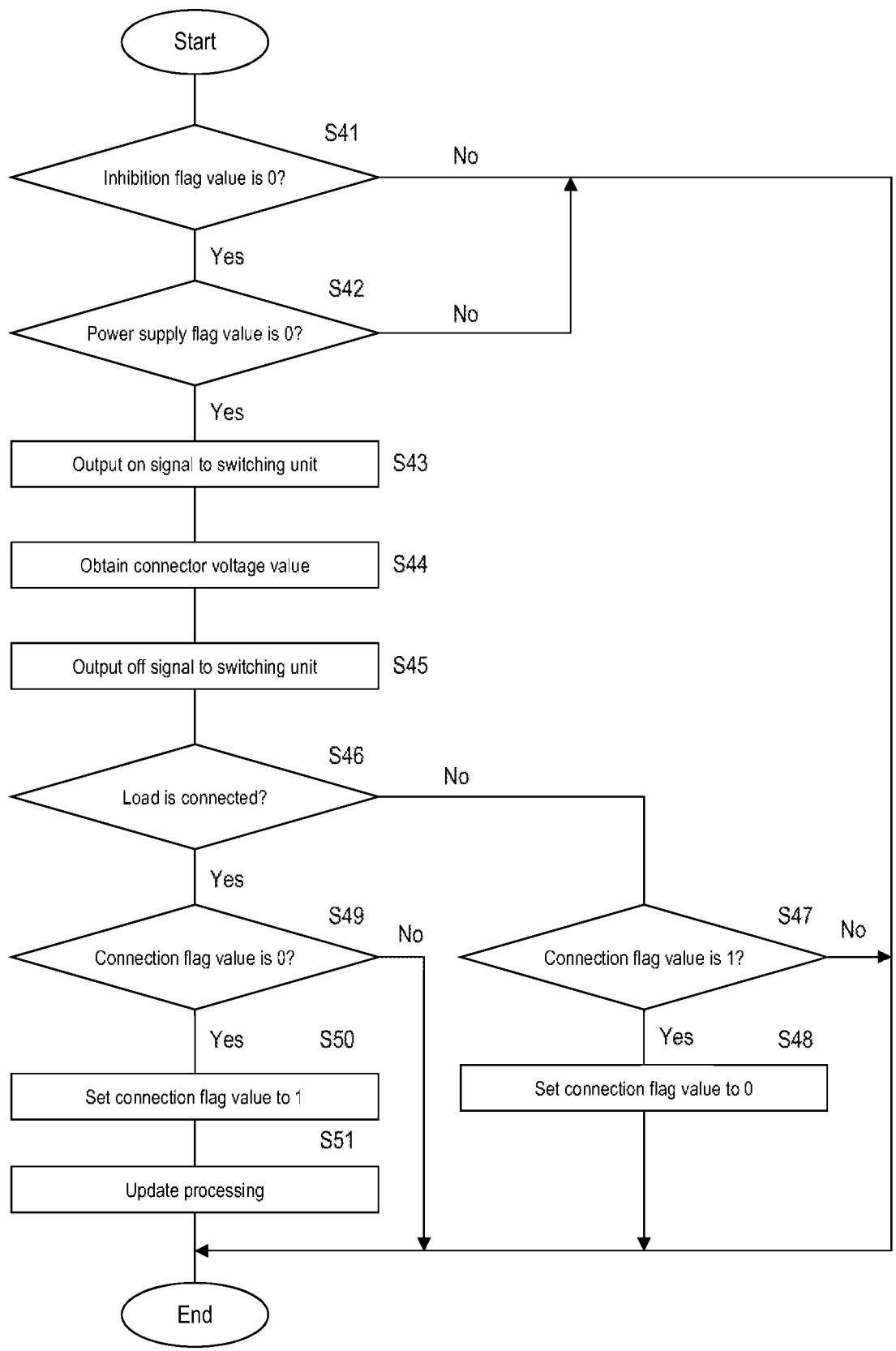
FIG. 9 is a flowchart showing the procedure of connection detection processing.

FIG. 9 is a flowchart showing the procedure of connection detection processing. The control unit 62 periodically executes the connection detection processing. The control unit 62 determines whether the value of the inhibition flag in the power supply control table 71 is 0 (step S41). If it is determined that the value of the inhibition flag is 0, in other words, power supply to the load 11 is permitted (S41: YES), the control unit 62 determines whether the value of the power supply flag is 0 (step S42).

If it is determined that the value of the inhibition flag is not 0, in other words, the value of the inhibition flag is 1 (S41: NO), the control unit 62 ends the connection detection processing. Accordingly, if power supply to the load 11 is inhibited, or if the power supply switch 30 is in the on state, the control unit 62 ends the connection detection processing.

If it is determined that the value of the power supply flag is 0, in other words, the power supply switch 30 is in the off state (S42: YES), the control unit 62 instructs the output unit 55 to output the on signal to the switching unit 46 (step S43). Accordingly, the switching unit 46 switches on the detection switch 45, and the voltage value of the voltage divided by the voltage-dividing resistor 44 and the load 11 is output to the input unit 51 as the analog connector voltage value. The analog connector voltage value that is input to the input unit 51 is converted into the digital connector voltage value by the A/D conversion unit 58.

After executing step S43, the control unit 62 obtains the connector voltage value from the A/D conversion unit 58 (step S44), and instructs the output unit 56 to output the off signal to the switching unit 46 (step S45). Accordingly, the switching unit 46 switches off the detection switch 45.

Next, the control unit 62 determines whether the load 11 is connected to the inner connectors B2 and B3 based on the connector voltage value obtained in step S44 (step S46). In step S46, if the connector voltage value is lower than the reference voltage value, the control unit 62 determines that the load 11 is connected to the inner connectors B2 and B3. If the connector voltage value is higher than or equal to the reference voltage value, the control unit 62 determines that the load 11 is not connected to the inner connectors B2 and B3. The control unit 62 detects the connection between the load 11 and the inner connectors B2 and B3 by executing step S46. The control unit 62 functions as a connection detection unit.

If it is determined that the load 11 is not connected to the inner connectors B2 and B3 (S46: NO), the control unit 62 determines whether the value of the connection flag in the power supply control table 71 is 1 (step S47). Here, the value of the connection flag being 1 means that the load 11 was connected to the inner connectors B2 and B3 at the time when the previous connection detection processing ended.

If it is determined that the value of the connection flag is not 1, that is, the value of the connection flag is 0 (S47: NO), the control unit 62 ends the connection detection processing. If it is determined that the value of the connection flag is 1 (S47: YES), the control unit 62 sets the value of the connection flag to 0 (step S48), and ends the connection detection processing.

If it is determined that the load 11 is connected to the inner connectors B2 and B3, that is, if the connection of the load 11 is detected (S46: YES), the control unit 62 determines whether the value of the connection flag in the power supply control table 71 is 0 (step S49). Here, the value of the connection flag being 0 means that the load 11 was not connected to the inner connectors B2 and B3 at the time when the previous connection detection processing ended.

If it is determined that the value of the connection flag is not 0, that is, the value of the connection flag is 1 (S49: NO), the control unit 62 ends the connection detection processing. If it is determined that the value of the connection flag is 0 (S49: YES), the control unit 62 sets the value of the connection flag to 1 (step S50), executes update processing for updating the plurality of waveform values stored in the waveform value table 72 (step S51), and ends the connection detection processing.

Figure 10:
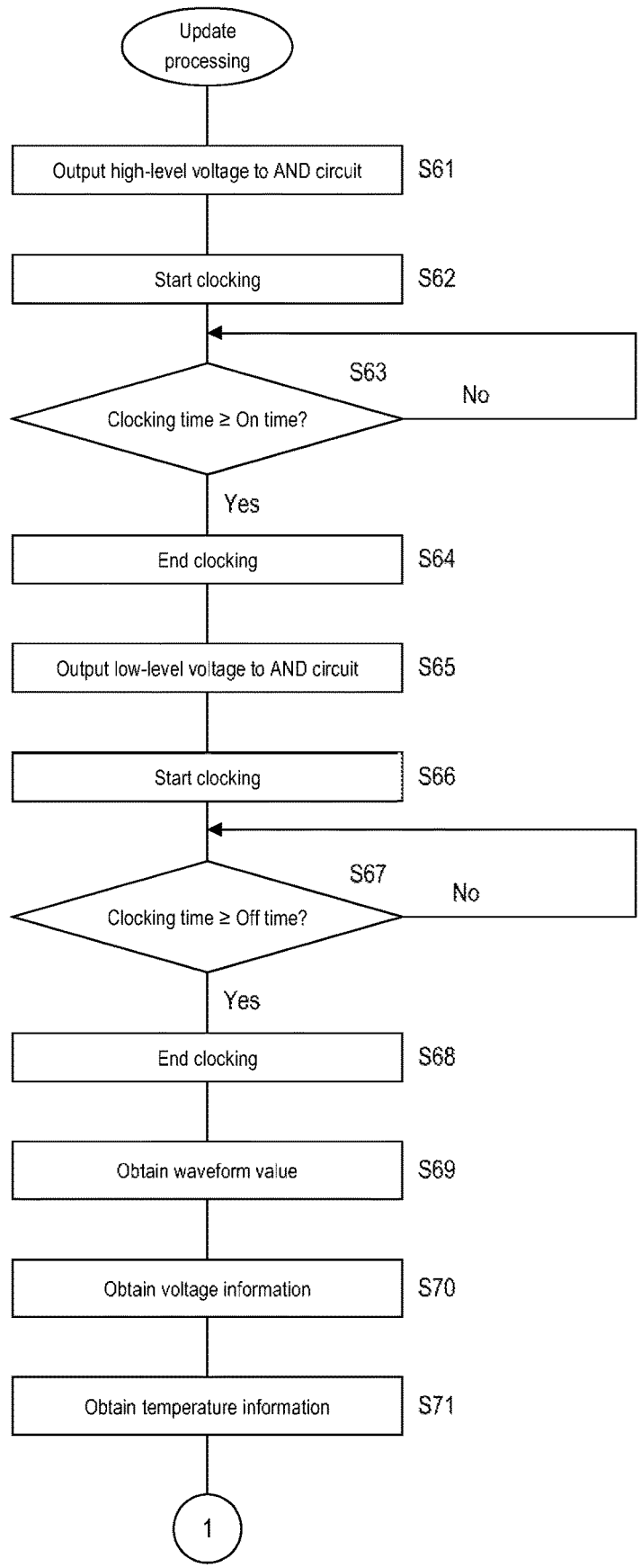
FIG. 10 is a flowchart showing the procedure of update processing.
Figure 11:
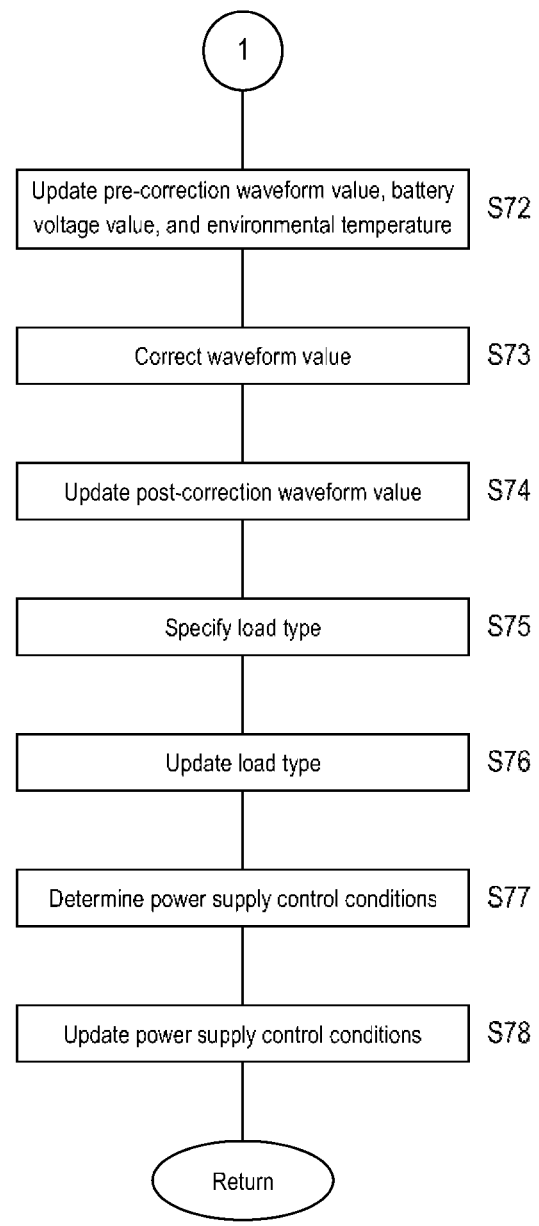
FIG. 11 is a flowchart showing the procedure of update processing.

FIG. 10 and FIG. 11 are flowcharts showing the procedure of update processing. In the description of the update processing, it is assumed that the inverter 40 outputs the high-level voltage, that is, the load current value is lower than the current threshold value. As described above, if the inverter 40 outputs the low-level voltage, the driving circuit 34 keeps the power supply switch 30 off independently of the output by the output unit 54.

In the update processing, first, the control unit 62 instructs the output unit 54 to output the high-level voltage to the AND circuit 35 (step S61). Accordingly, the AND circuit 35 outputs the high-level voltage to the driving circuit 34, the driving circuit 34 switches the power supply switch 30 from off to on, and a current flows from the battery 10 to the load 11.

Next, the control unit 62 instructs the timer 60 to start clocking (step S62), and determines whether the clocking time clocked by the timer 60 is longer than or equal to an on time (step S63). The on time is a predetermined constant value. If it is determined that the clocking time is shorter than the on time (S63: NO), the control unit 62 executes step S63 again, and stands by until the clocking time reaches or exceeds the on time. If it is determined that the clocking time is longer than or equal to the on time (S63: YES), the control unit 62 instructs the timer 60 to end the clocking (step S64).

Next, the control unit 62 instructs the output unit 54 to output the low-level voltage to the AND circuit 35 (step S65). Accordingly, the AND circuit 35 outputs the low-level voltage to the driving circuit 34, the driving circuit 34 switches the power supply switch 30 from on to off, and supply of power from the battery 10 to the load 11 is stopped.

Next, the control unit 62 instructs the timer 60 to start clocking again (step S66), and determines whether the clocking time clocked by the timer 60 is longer than or equal to an off time (step S67). The off time is also a predetermined constant value. If it is determined that the clocking time is shorter than the off time (S67: NO), the control unit 62 executes step S67 again, and stands by until the clocking time reaches or exceeds the off time. If it is determined that the clocking time is longer than or equal to the off time (S67: YES), the control unit 62 instructs the timer 60 to end the clocking (step S68).

As described above, the power supply switch 30 is kept in the on state from when the update processing starts to when the on time elapses, and thereafter, the power supply switch 30 is kept in the off state until the off time elapses. Accordingly, the load current value draws the current waveform as shown in FIG. 3. As described above, the waveform value detection unit 42 detects the plurality of waveform values, and outputs the detected waveform values to the input unit 53.

After executing step S68, the control unit 62 obtains the plurality of waveform values from the input unit 53 (step S69). The plurality of waveform values obtained in step S69 are the steady current value, the inrush current value, the time constant of inrush current, the inrush current count, the rising speed of inrush current, the ripple current value, the ripple current period, and the reflux time. Next, the control unit 62 obtains the voltage information from the A/D conversion unit 57 (step S70), and obtains the temperature information from the A/D conversion unit 59 (step S71). Next, the control unit 62 updates the pre-correction values of waveform values; the battery voltage value; and the environment temperature in the power supply control table 71 (step S72).

Specifically, the control unit 62 updates the pre-correction waveform values to the waveform values obtained in step S69. The control unit 62 updates the battery voltage value in the power supply control table 71 to the battery voltage value indicated by the voltage information obtained in step S70, and updates the environment temperature in the power supply control table 71 to the environment temperature indicated by the temperature information obtained in step S71.

Next, the control unit 62 corrects the pre-correction waveform values in the waveform value table 72 to the waveform values in the case where the battery voltage value is a predetermined voltage value and the environment temperature is a predetermined temperature (step S73), based on the battery voltage value and the environment temperature stored in the waveform value table 72. The control unit 62 also functions as a correction unit and a second correction unit. Next, the control unit 62 updates the post-correction waveform values in the waveform value table 72 to the waveform values that were corrected in step S73 (step S74).

Next, the control unit 62 specifies the type of the load 11 based on the post-correction waveform values in the waveform value table 72 (step S75). For one example, the plurality of waveform values corresponding to the plurality of types relating to the load 11 are stored in the storage unit 61 in advance. In step S75, the control unit 62 calculates the correlation values between the waveform values corresponding to the types and the post-correction waveform values relating to the waveform value table 72. The control unit 62 specifies the type of the load 11 as the type for which the similarity indicated by the calculated correlation value is the highest out of the above-described types.

In another example, the control unit 62 specifies the type of the load 11 using a learning model that has learned the relationship between the waveform values and the types of the load 11. The learning model is, for example, constituted by a neutral network, and is constituted by an input layer, a plurality of intermediate layers, and an output layer. Nodes in the layers are each connected to nodes in the adjacent layers. The relationship between the plurality of waveform values and the types of the load 11 is learned by the learning model in advance by using a plurality of pieces of training data including waveform value data and load type data. In step S75, the control unit 62 inputs, into the input layer of the learning model, the waveform value data indicating the post-correction waveform values in the waveform value table 72, and specifies the type of the load 11 based on the output value that is output by the output layer of the learning model. The output value of the output layer indicates a probability of each of the types corresponding to the actual type of the load 11. The control unit 62 also functions as a specifying unit.

Next, the control unit 62 updates the type of the load 11 stored in the power supply control table 71 to the type specified in step S75 (step S76).

Next, the control unit 62 determines the power supply control conditions based on the type in the power supply control table 71 and the post-correction waveform values in the waveform value table 72 (step S77). Specifically, the power supply control conditions include the variable resistance value, the current threshold value, the value of the PWM flag, and the duty ratio of the PWM signal. The control unit 62 also functions as a determination unit.

For example, conditions regarding power supply control for each type of the loads 11 are stored in the storage unit 61 in advance. In step S77, the control unit 62 determines the power supply control conditions that are to be the conditions corresponding to the type of the load 11 specified in step S75.

As described above, the current threshold value Ith and the variable resistance value Rv satisfies Ith=N·Vd/Rv. N and Vd are a predetermined number and a power source voltage value, respectively, and are constant values. Deciding the value of the PWM flag corresponds to deciding whether to perform PWM control on turning on and off of the power supply switch 30.

Next, the control unit 62 updates the power supply control condition in the power supply control table 71 to the power supply control conditions determined in step S77 (step S78). After executing step S78, the control unit 62 ends the update processing and returns the processing to the connection detection processing. As described above, if the control unit 62 ends the update processing, the control unit 62 also ends the connection detection processing.

As described above, in the connection detection processing, if the load 11 is connected to the inner connectors B2 and B3, the control unit 62 detects the connection, and executes the update processing. In the update processing, the control unit 62 causes the driving circuit 34 to switch the power supply switch 30 from off to on, and thereafter, causes the driving circuit 34 to switch the power supply switch 30 from on to off. The control unit 62 determines the power supply control conditions based on the obtained plurality of waveform values and updates the power supply control conditions in the power supply control table 71.

For this reason, if the load 11 connected to the inner connectors B2 and B3 is changed, the current waveform of the load current value changes, and thus the power supply control conditions in the power supply control table 71 are immediately updated. For this reason, changing the power supply control conditions requires a short period of time.

Note that the waveform values used in determination of the power supply control conditions, that is, the waveform values stored in the waveform value table 72, are not limited to the steady current value, the time constant of inrush current, the inrush current count, the rising speed of the load current value, the ripple current value, the ripple current period, and the reflux time. Also, the waveform values need not include all of the steady current value, the time constant of inrush current, the inrush current count, the rising speed of the load current value, the ripple current value, the ripple current period, and the reflux time. Furthermore, the number of waveform values is not limited to seven, and may also be any of 1 to 6, or 8 or more.

Furthermore, the items included in the power supply control conditions are not limited to the variable resistance value, the current threshold value, the value of the PWM flag, and the duty ratio. For example, a temperature threshold value may also be included as an item of the power supply control conditions. Furthermore, instead of the temperature estimation unit 47, the control unit 62 of the microcomputer 21 may also estimate the environment temperature that is an ambient temperature around the load 11 based on the values of various parameters regarding the load 11.

Also, if the waveform value dependent on the environment temperature, for example, the inrush current value, is not included in the waveform values stored in the waveform value table 72, the correction based on the environment temperature is not necessary. Furthermore, if the waveform value dependent on the battery voltage value is not included in the waveform values stored in the waveform value table 72, the correction based on the battery voltage value is not necessary.

Also, the power supply switch 30 is not limited to an N-channel FET, and may also be a P-channel FET, a bipolar transistor, a relay contact, or the like.

Note that the present embodiment disclosed as above is illustrative and should be construed as non-limiting in all respects. The present disclosure is not limited to the above-described meanings but is indicated by the claims, and all modifications that fall within the meaning and range of equivalency with the claims are intended to be encompassed therein.

The invention claimed is:

1. A power supply control device that controls power supply to a load via a switch, the power supply control device comprising:
    a switching unit configured to switch on or off the switch; and
    a determination unit configured to, if the switching unit switches the switch from off to on, determine power supply control conditions regarding control of power supply to the load, based on a waveform value regarding a current waveform of a current that flows through the load;
    wherein the switching unit keeps the switch off for a certain time period after keeping the switch on for a certain time period, and
    the determination unit determines the power supply control conditions based on a waveform value of the current waveform in a time period from when the switching unit starts to keep the switch on to when the switching unit ends keeping the switch off.

2. The power supply control device according to claim 1, further comprising:
    a connector that is disposed on a current path of the current that flows via the switch, and to which the load is detachably connected; and
    a connection detection unit configured to detect a connection between the load and the connector,
    wherein the switching unit switches the switch from off to on if the connection detection unit detects the connection.

3. The power supply control device according to claim 1, wherein the switching unit switches off the switch when a current value of a current that flows through the load reaches a current threshold value or higher, and
    the power supply control conditions include the current threshold value.

4. The power supply control device according to claim 1, further comprising:
    a voltage detection circuit configured to detect a voltage value of a voltage that is applied to the load; and
    a correction unit configured to correct the waveform value based on the voltage value detected by the voltage detection circuit.

5. The power supply control device according to claim 1, further comprising:
    a temperature estimation unit configured to estimate an ambient temperature around the load; and
    a second correction unit configured to correct the waveform value based on the ambient temperature estimated by the temperature estimation unit.

6. The power supply control device according to claim 1, further comprising
    a specifying unit configured to specify a type of the load based on the waveform value,
    wherein the determination unit determines the power supply control conditions that are to be power supply control conditions corresponding to the type specified by the specifying unit.

7. A power supply control method comprising:
    a step of switching on or off a switch;
    a step of obtaining a waveform value regarding a current waveform of a current that flows through a load if the switch is switched from off to on; and
    a step of determining power supply control conditions regarding control of power supply to the load based on the obtained waveform value;
    a step of keeping the switch on for a certain time period; and
    a step of keeping the switch off for a certain time period after keeping the switch on for a certain time period,
    wherein the waveform value is obtained in a time period from when keeping the switch on is started to when keeping the switch off is ended.

8. A computer program comprising a non-transitory, machine-readable medium storing instructions which, when executed by at least one programmable processor, caused at least one programmable processor to perform operations comprising:
    a step of instructing that a switch be turned on or off;
    a step of obtaining a waveform value regarding a current waveform of a current that flows through a load if the switch is switched from off to on; and
    a step of determining power supply control conditions regarding control of power supply to the load based on the obtained waveform value;
    a step of keeping the switch on for a certain time period; and
    a step of keeping the switch off for a certain time period after keeping the switch on for a certain time period,
    wherein the waveform value is obtained in a time period from when keeping the switch on is started to when keeping the switch off is ended.

9. The power supply control device according to claim 2, wherein the switching unit switches off the switch when a current value of a current that flows through the load reaches a current threshold value or higher, and
    the power supply control conditions include the current threshold value.

10. The power supply control device according to claim 2, further comprising:
    a voltage detection circuit configured to detect a voltage value of a voltage that is applied to the load; and
    a correction unit configured to correct the waveform value based on the voltage value detected by the voltage detection circuit.

11. The power supply control device according to claim 3, further comprising:
   a voltage detection circuit configured to detect a voltage value of a voltage that is applied to the load; and
   a correction unit configured to correct the waveform value based on the voltage value detected by the voltage detection circuit.

12. The power supply control device according to claim 2, further comprising:
   a temperature estimation unit configured to estimate an ambient temperature around the load; and
   a second correction unit configured to correct the waveform value based on the ambient temperature estimated by the temperature estimation unit.

13. The power supply control device according to claim 3, further comprising:
   a temperature estimation unit configured to estimate an ambient temperature around the load; and
   a second correction unit configured to correct the waveform value based on the ambient temperature estimated by the temperature estimation unit.

14. The power supply control device according to claim 4, further comprising:
   a temperature estimation unit configured to estimate an ambient temperature around the load; and
   a second correction unit configured to correct the waveform value based on the ambient temperature estimated by the temperature estimation unit.

15. The power supply control device according to claim 2, further comprising
   a specifying unit configured to specify a type of the load based on the waveform value,
   wherein the determination unit determines the power supply control conditions that are to be power supply control conditions corresponding to the type specified by the specifying unit.

16. The power supply control device according to claim 3, further comprising
   a specifying unit configured to specify a type of the load based on the waveform value,
   wherein the determination unit determines the power supply control conditions that are to be power supply control conditions corresponding to the type specified by the specifying unit.

17. The power supply control device according to claim 4, further comprising
   a specifying unit configured to specify a type of the load based on the waveform value,
   wherein the determination unit determines the power supply control conditions that are to be power supply control conditions corresponding to the type specified by the specifying unit.

18. The power supply control device according to claim 5, further comprising
   a specifying unit configured to specify a type of the load based on the waveform value,
   wherein the determination unit determines the power supply control conditions that are to be power supply control conditions corresponding to the type specified by the specifying unit.

* * * * *